(12) United States Patent
Eidson

(10) Patent No.: US 6,975,653 B2
(45) Date of Patent: Dec. 13, 2005

(54) SYNCHRONIZING CLOCKS ACROSS SUB-NETS

(75) Inventor: John C. Eidson, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 916 days.

(21) Appl. No.: 09/880,540

(22) Filed: Jun. 12, 2001

(65) Prior Publication Data

US 2002/0186716 A1    Dec. 12, 2002

(51) Int. Cl.[7] .............................................. H04J 3/06
(52) U.S. Cl. ....................................... 370/503; 375/354
(58) Field of Search ............................... 370/474, 496, 370/497, 498, 503, 508, 516, 520, 522, 504, 370/505, 506, 507; 375/354

(56) References Cited

U.S. PATENT DOCUMENTS

| | | | | |
|---|---|---|---|---|
| 5,590,116 | A * | 12/1996 | Zhang | 370/253 |
| 5,870,441 | A * | 2/1999 | Cotton et al. | 375/354 |
| 6,032,261 | A | 2/2000 | Hulyalkar | |
| 6,246,702 | B1 * | 6/2001 | Fellman et al. | 370/503 |
| 6,324,586 | B1 * | 11/2001 | Johnson | 709/248 |
| 6,377,579 | B1 * | 4/2002 | Ofek | 370/395.4 |
| 6,532,274 | B1 * | 3/2003 | Ruffini | 375/356 |
| 6,611,537 | B1 * | 8/2003 | Edens et al. | 370/503 |
| 6,665,316 | B1 * | 12/2003 | Eidson | 370/509 |
| 6,677,858 | B1 * | 1/2004 | Faris et al. | 340/573.1 |
| 6,757,282 | B1 * | 6/2004 | Ofek | 370/389 |
| 6,819,682 | B1 * | 11/2004 | Rabenko et al. | 370/503 |
| 6,832,347 | B1 * | 12/2004 | Parrish | 714/51 |
| 2002/0080829 | A1 * | 6/2002 | Ofek et al. | 370/539 |

FOREIGN PATENT DOCUMENTS

| EP | 0 991 216 | 4/2000 |
|---|---|---|
| EP | 1 047 213 | 10/2000 |

OTHER PUBLICATIONS

EP Search Report dated Feb. 7, 2005.

* cited by examiner

Primary Examiner—Brian Nguyen

(57) ABSTRACT

A distributed system with a time synchronization bridge for maintaining a relatively accurate common sense of time across sub-nets despite the use of a communication device such as a router which causes jitter in packet transfers across sub-nets. A distributed system according to the present teachings includes a set of nodes that communicate via a set of sub-nets. The nodes each have a local clock and mechanisms for maintaining time synchronization among the local clocks by transferring timing data packets via the sub-nets. The timing data packets do not pass through a router. Instead, a time synchronization bridge obtains the timing data packets and in response coordinates time synchronization across the sub-nets.

19 Claims, 5 Drawing Sheets

SYNCHRONIZING CLOCKS ACROSS SUB-NETS

BACKGROUND OF THE INVENTION

1. Field of Invention

The present invention pertains to the field of distributed systems. More particularly, this invention relates to synchronizing clocks across sub-nets of a distributed system.

2. Art Background

Distributed systems commonly include an arrangment of nodes which are interconnected via a communication network. Such distributed systems include distributed control systems and distributed computer systems to name a few examples. A communication network for such a system may be implemented with a packet-based protocol such as Ethernet or one or more of a variety of packet-based protocols which are adapted to distributed control system applications.

Some or all of the nodes of a distributed system may include a local clock which maintains a local time for a node. It is commonly desirable to maintain a common sense of time in a distributed system by synchronizing the local times maintained in the local clocks of its nodes.

One prior protocol for synchronizing the local clocks of a distributed system is the Network Time Protocol (NTP). Typically, a node operating according to NTP periodically generates a packet containing a time value obtained from its local clock and transfers the packet via the communication network. Nodes running NTP usually gather these packets from the communication network and perform statistical analysis of the obtained time data and in response adjust the time values in their local clocks.

A relatively large communication network usually includes communication devices such as routers which enable communication among large numbers of nodes. A typical router may be characterized as a store and forward device because it stores incoming packets and processes information associated with the incoming packets before forwarding the packets onto their destinations. Portions of a communication network that are separated by a router may be referred to as sub-nets of the communication network. A communication network may include any number of routers and sub-nets.

Typically, the store and forward functions of a router cause a relatively large variation in the transfer time of packets between nodes located on different sub-nets. The variation in packet transfer time may be referred to as jitter. Unfortunately, the relatively large amount of jitter introduced by store and forward devices such as routers severely limits the accuracy of time synchronization across sub-nets using prior mechanisms such as NTP.

SUMMARY OF THE INVENTION

A distributed system is disclosed with a time synchronization bridge for maintaining a relatively accurate common sense of time across sub-nets despite the use of a communication device such as a router which causes jitter in packet transfers across sub-nets.

A distributed system according to the present teachings includes a set of node's that communicate via a set of sub-nets. The nodes each have a local clock and mechanisms for maintaining time synchronization among the local clocks by transferring timing data packets via the sub-nets. The timing data packets do not pass through a router. Instead, a time synchronization bridge obtains the timing data packets and in response coordinates time synchronization across the sub-nets.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
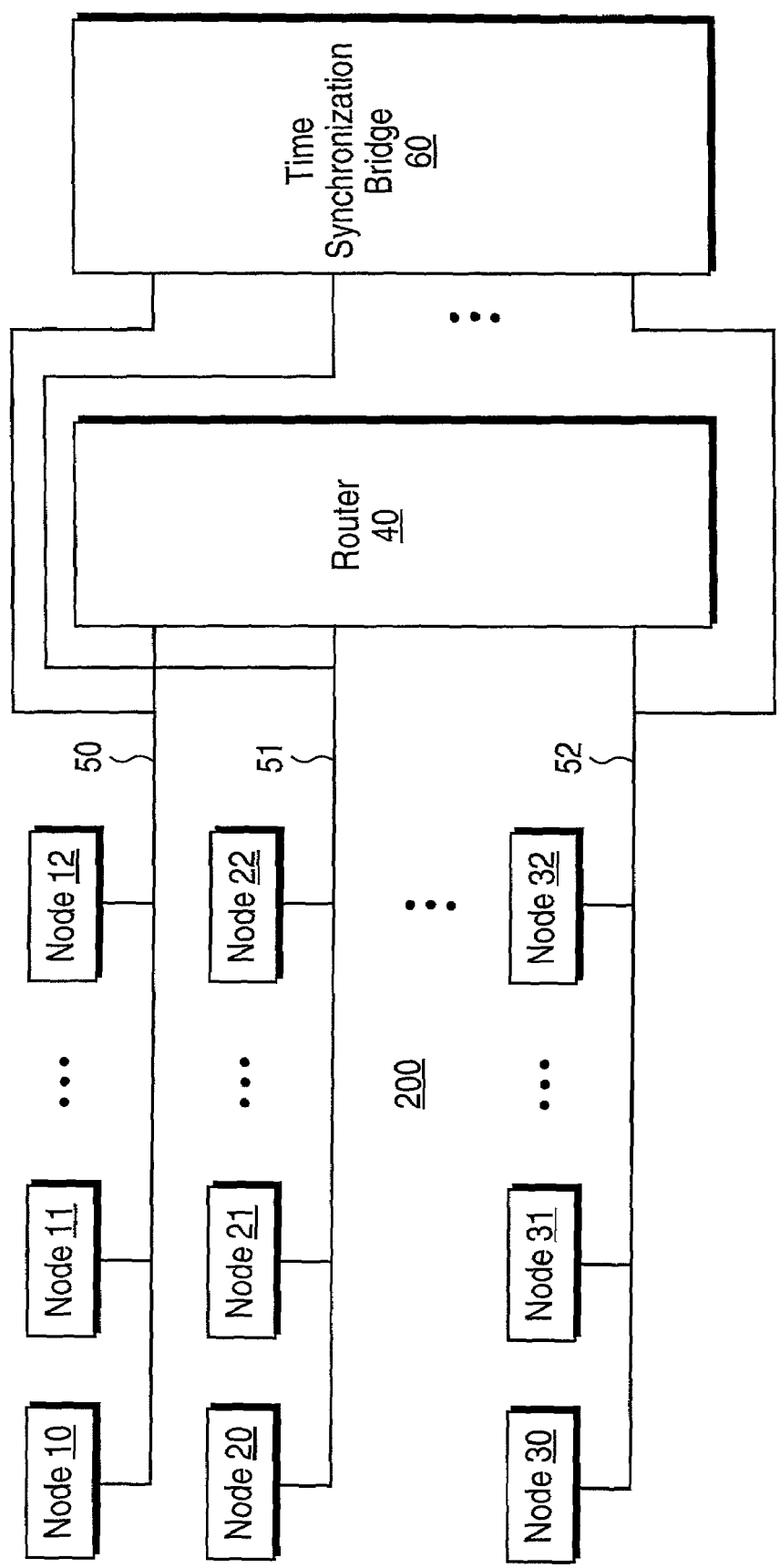
FIG. 1 shows a distributed system according to the present teachings.

FIG. 1 shows a distributed system 200 according to the present teachings. The distributed system 200 includes a set of sub-nets 50–52. The sub-net 50 enables communication among a set of nodes 10–12, the sub-net 51 enables communication among a set of nodes 20–22, and the sub-net 52 enables communication among a set of nodes 30–32. The distributed system 200 includes a router 40 that enables communication between the sub-nets 50–52. In one embodiment, the sub-nets 50–52 are Ethernet sub-nets and the router 40 is an Ethernet router.

The nodes 10–12 participate in a synchronization protocol for maintaining a synchronized local time in the nodes 10–12. The synchronization protocol includes transmitting and receiving timing data packets via the sub-net 50. Similarly, the nodes 20–22 participate in the synchronization protocol by transmitting and receiving timing data packets via the sub-net 51 and the nodes 30–32 participate in the synchronization protocol by transmitting and receiving timing data packets via the sub-net 52. In one embodiment, the timing data packets are multi-cast packets having a time-to-live indicator set to one according to Ethernet standards which prevents them from being sent across the sub-nets 50–52 by the router 40.

The distributed system 200 includes a time synchronization bridge 60 that coordinates time synchronization across the sub-nets 50–52 using information contained in the timing data packets from the nodes 10–12, 20–22, and 30–32. The time synchronization bridge 60 bypasses the jitter associated with the router 40 and provides a relatively accurate common sense of time among the nodes 10–12, 20–22, and 30–32. The time synchronization bridge 60 maintains an internal time and includes mechanisms for synchronizing the internal time to a best, i.e. a high quality or preferred clock, in the distributed system 200 and for distributing the internal time to the remaining local clocks in the distributed system 200 by generating its own timing data packets.

Figure 2:
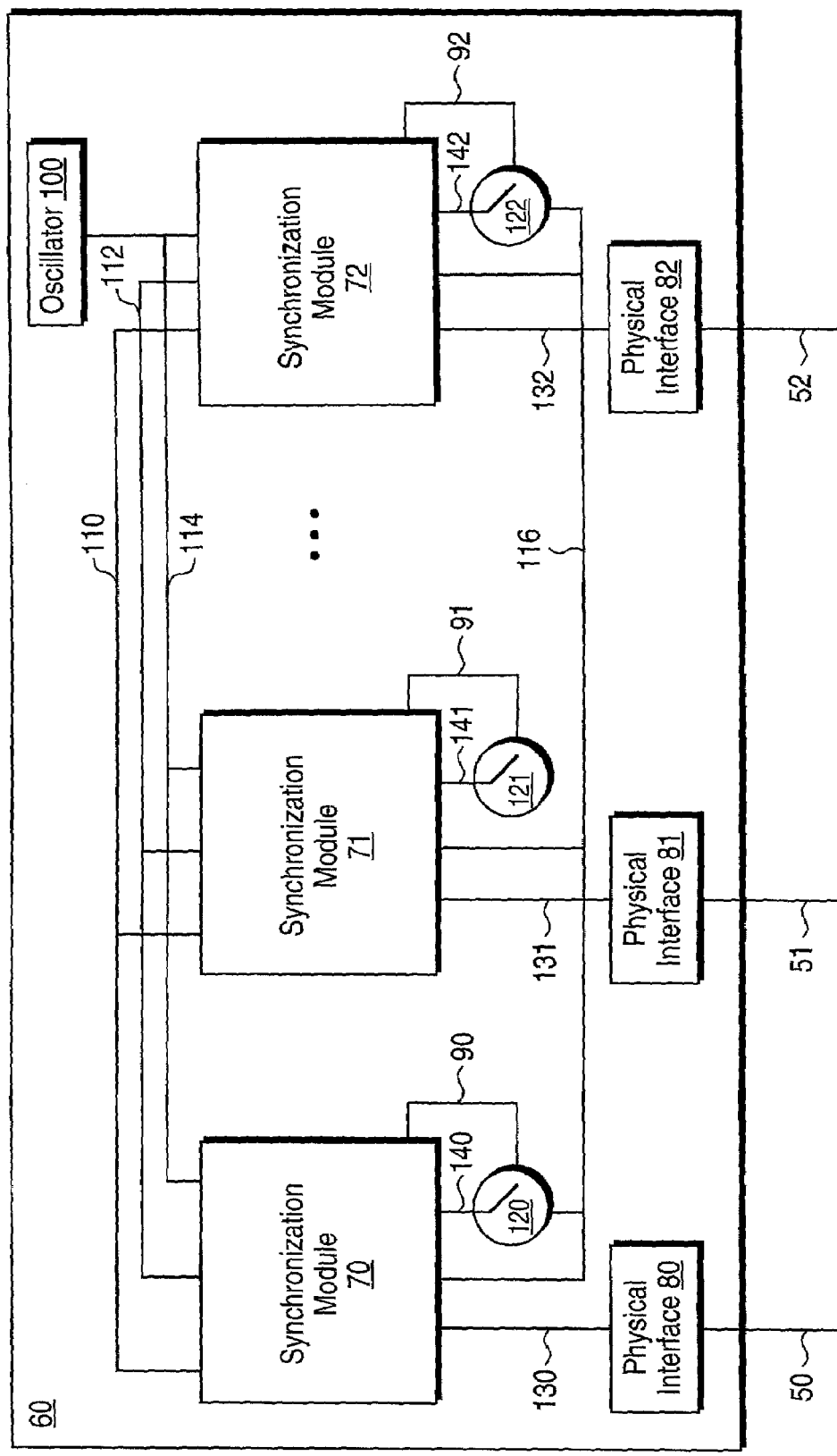
FIG. 2 illustrates a time synchronization bridge in one embodiment.

FIG. 2 illustrates the time synchronization bridge 60 in one embodiment. The time synchronization bridge 60 includes a set of synchronization modules 70–72 which communicate with the sub-nets 50–52, respectively, through a set of corresponding physical interfaces 80–82. The synchronization module 70 sends and receives timing data packets via the sub-net 50, the synchronization module 71 sends and receives timing data packets via the sub-net 51, and the synchronization module 72 sends and receives timing data packets via the sub-net 52.

In this embodiment, each synchronization module 70–72 includes a clock which is driven by an oscillator signal 114 generated by an oscillator 100. Alternatively, each synchronization module 70–72 may have its own oscillator.

The synchronization modules 70–72 communicate with each other via a communication bus 110. Information transferred via the communication bus 110 enables the synchronization modules 70–72 to determine which is to function as the primary clock within the time synchronization bridge 60 and to determine a best quality or preferred clock in the distributed system 200 to which all remaining clocks will be synchronized.

In one embodiment, the communication bus 110 provides TDMA communication among the synchronization modules 70–72 and a control bus 112 is used to indicate which of the synchronization modules 70–72 has control of the communication bus 110 at any given time. The synchronization module 70–72 that drives the control bus 112 may be chosen arbitrarily. The communication bus 110 may be RS485, a token-ring arrangement, or may be implemented as a shared memory to name a few examples.

The synchronization modules 70–72 collectively determine which of their internal clocks is to function as the primary clock of the time synchronization bridge 60. Each synchronization module 70–72 generates a respective one pulse per second (1-PPS) signal 140–142 from its internal clock. A set of switches 120–122 are used to select one of the 1-PPS signals 140–142 to provide a master time pulse 116 for all of the synchronization modules 70–72. The internal clocks in all of the synchronization modules 70–72 synchronize to the master time pulse 116. The actual real-time associated with the master time pulse 116 is communicated via the communication bus 110.

For example, if it is determined that the internal clock in the synchronization module 70 is to be the primary clock, then the synchronization module 70 generates a control signal 90 to close the switch 120 and the synchronization modules 71–72 generate the control signals 91–92 to open the switches 121–122. Thereafter, during each master time pulse 116 obtained from the 1-PPS signal 140, the synchronization module 70 transmits the full time value from its internal clock via the communication bus 110. The synchronization modules 71–72 use the time value on the communication bus 110 together with the master time pulse 116 to synchronize their respective internal clocks.

Figure 3:
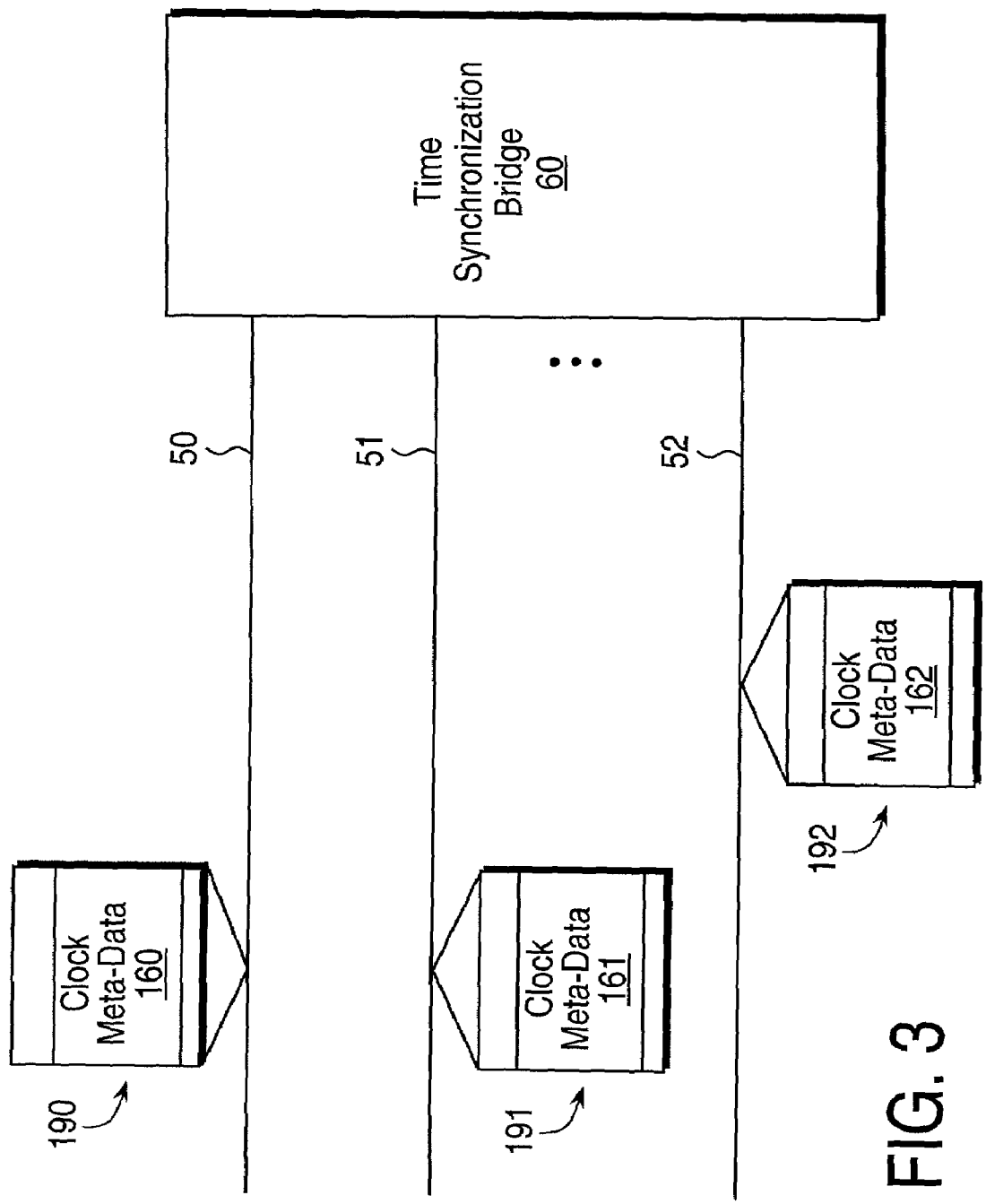
FIG. 3 illustrates an example determination of which of a set of synchronization modules is to be the primary clock in a time synchronization bridge.

FIG. 3 illustrates an example determination of which of the synchronization modules 70–72 is to be the primary clock in the time synchronization bridge 60. The time synchronization bridge 60 receives a set of timing data packets 190–192 via the sub-nets 50–52, respectively. The timing data packets 190–192 may originate with any one of the respective nodes 10–12, 20–22, and 30–32. The timing data packets 190–192 carry respective sets of clock meta-data 160–162.

The clock meta-data 160–162 provides information regarding the quality of the clock associated with the corresponding timing data packet 190–192. For example, if the node 10 generates the timing data packet 190 then the clock meta-data 160 indicates the quality of the clock in the node 10. In one embodiment, the quality of a clock may be indicated by a stratum number. For example, a stratum equal to one may indicate a clock that provides time obtained from a GPS receiver or time obtained from an atomic clock whereas a stratum greater than one may indicate time obtained from a less precise source. Other clock meta-data may indicate clock statistics such as variance and/or quantization. The clock meta-data may include fields that enable a user to specify the local clock in a particular node as a preferred clock from which all time in the distributed system 200 is to be derived.

The synchronization modules 70–72 extract the clock meta-data 160–162 from the timing data packets 190–192 and distribute it amongst themselves via the communication bus 110. The time synchronization bridge 60 itself includes a set of clock meta-data that provides similar information about the quality of the time maintained by its clocks Using this information, each synchronization module 70–72 independently determines the primary clock for the time synchronization bridge 60 using the same information and the same criteria. Alternatively, a central processor may be implemented in the time synchronization bridge 60 to make the determination of a primary clock using the same information. The selected primary clock may be the clock in the synchronization module that is on the same sub-net as the best clock.

For example, assume that the clock meta-data 160–162 and the clock meta-data for the time synchronization bridge 60 indicate that the best clock is associated with the clock meta-data 160. The internal clock in the synchronization module 70 because it is on the same sub-net as the best clock is selected as the primary clock and synchronizes to the master clock on the sub-net 50 that originated the timing data packet 190. The synchronization modules 71–72 synchronize their internal clocks to the synchronization module 70 and drive the sub-nets 51–52 as a master clock according to the synchronization protocol by issuing timing data packets via the sub-nets 51–52. The timing data packets issued via the sub-nets 51–52 include the clock meta-data associated with the master clock on the sub-net 50.

As another example, assume that the clock meta-data 160–162 and the clock meta-data for the time synchronization bridge 60 indicate that all clocks have substantially the same quality or that the clocks in the time synchronization bridge 60 have the best quality. One of the synchronization modules 70–72 is selected as the primary clock, for example the same one that drives the control bus 112, and remaining of the synchronization modules 70–72 synchronize to it. The synchronization modules 70–72 drive the sub-nets 50–52 as master clocks by issuing timing data packets.

Each set of clock meta-data 160–162 includes an identifier (CLOCK-UUID) for the clock associated with the corresponding timing data packet 190–192 along an indication of the number of time synchronization bridges that the corresponding timing data packet 190–192 has passed through. The synchronization modules 70–72 prefer to select master clocks whose timing data packets have passed through, i.e. traversed, the fewest number of time synchronization bridges. The synchronization modules 70–72 updates this indication when it generates timing data packets and passes on the meta-data for the selected master clock.

Each set of clock meta-data 160–162 includes a port identifier (PORT#) associated with the node that originated the corresponding timing data packet 190–192. For example, each of the connections to the sub-nets 50–52 on the time synchronization bridge 60 has a port number which is sent with the meta data in timing data packets generated by the synchronization modules 70–72.

Figure 4:
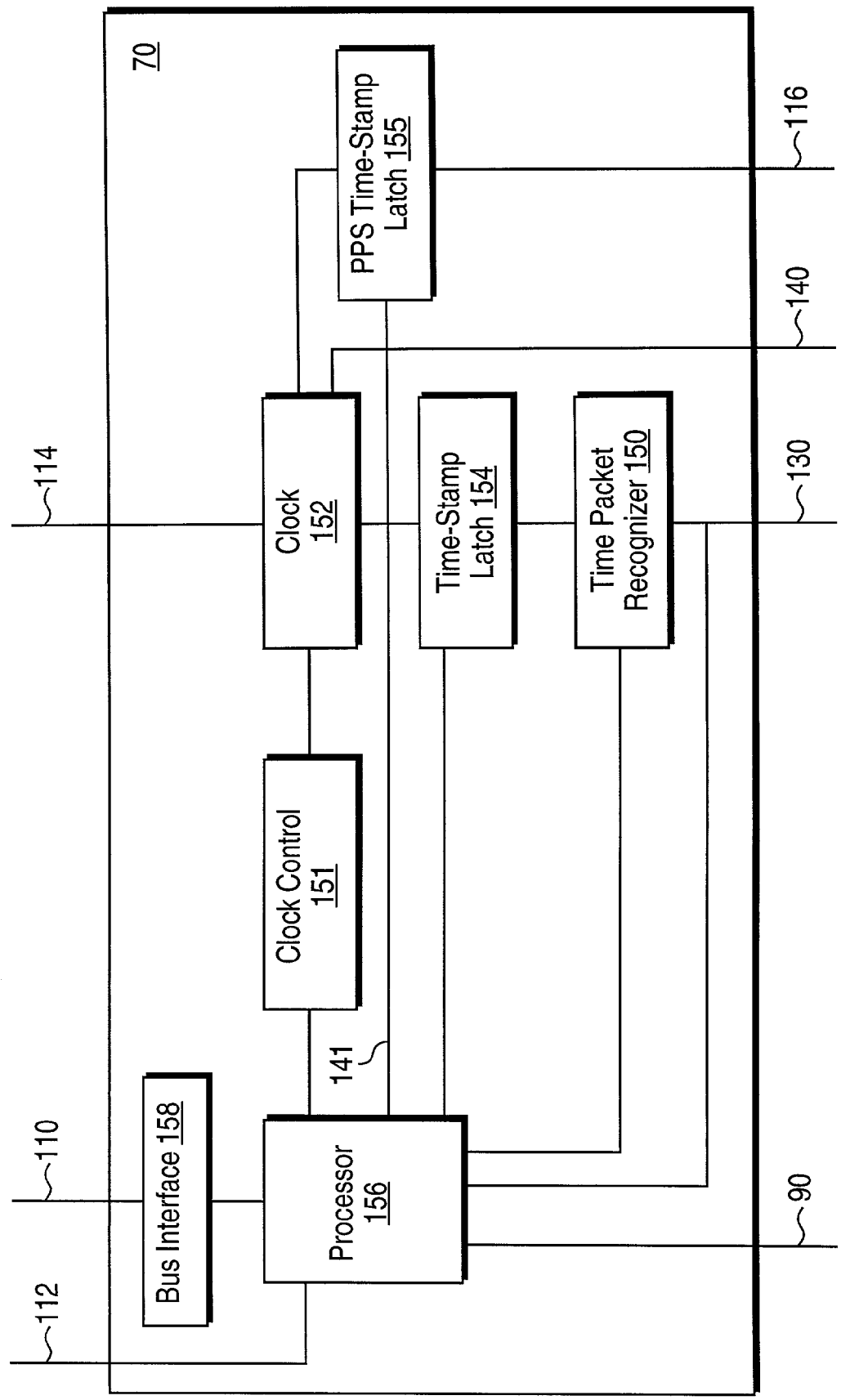
FIG. 4 shows an example implementation of a synchronization module.

FIG. 4 shows an example implementation of the synchronization module 70. The synchronization modules 71–72 may be implemented in a similar manner. The synchronization module 70 includes a clock 152 which is driven by the oscillator signal 114 along with a time-stamp latch 154, a time packet recognizer 150, a PPS time-stamp latch 155, a clock control 151, and a processor 156. The clock 152 provides the 1-PPS signal 140.

If the clock 152 is a slave clock then the time packet recognizer 150 and the processor 156 perform the appropriate functions for synchronizing the clock 152 to a master clock. The time packet recognizer 150 causes the time-stamp latch 154 to latch a local time value from the clock 152 when the timing data packet 190 is detected. The processor 156 obtains the latched time value from the time-stamp latch 154 and obtains a follow up packet from the master clock via the sub-net 50. The processor 156 uses the latched time value and a time-stamp contained in the follow up packet to compute an offset value. The processor 156 provides the offset value to the clock control 151 which generates a slew value that adjusts the time in the clock 152.

If the clock 152 is a master clock then the time packet recognizer 150 and/or the processor 156 generate timing data packets and follow up packets and transfers them via the sub-net 50 to synchronize local clocks on the sub-net 50.

The processor 156 obtains the timing data packet 190, extracts the clock meta-data 160, and communicates it via the communication bus 110 through a bus interface 158. If the clock 152 is selected as the primary clock then the processor 156 uses the control signal 90 to close the switch 120 and distributes a time value obtained from the clock 152 via the communication bus 110. If the clock 152 is not the primary clock then the processor 156 adjusts the clock 152 to conform to the time value distributed via the communication bus 110 in sync with the master time pulse 116. The PPS time-stamp latch 155 time-stamps the master time pulse and the processor 156 uses this PPS time-stamp to compute clock adjustments.

The clock 152 may be implemented as a counter driven by the oscillator signal 114. The least significant few bits of the counter may be implemented as an adder so that the increment on oscillator periods may be occasionally increased or decreased to effectively speed up or slow down the clock 152 when synchronizing it to some other clock in the distributed system 200.

Figure 5:
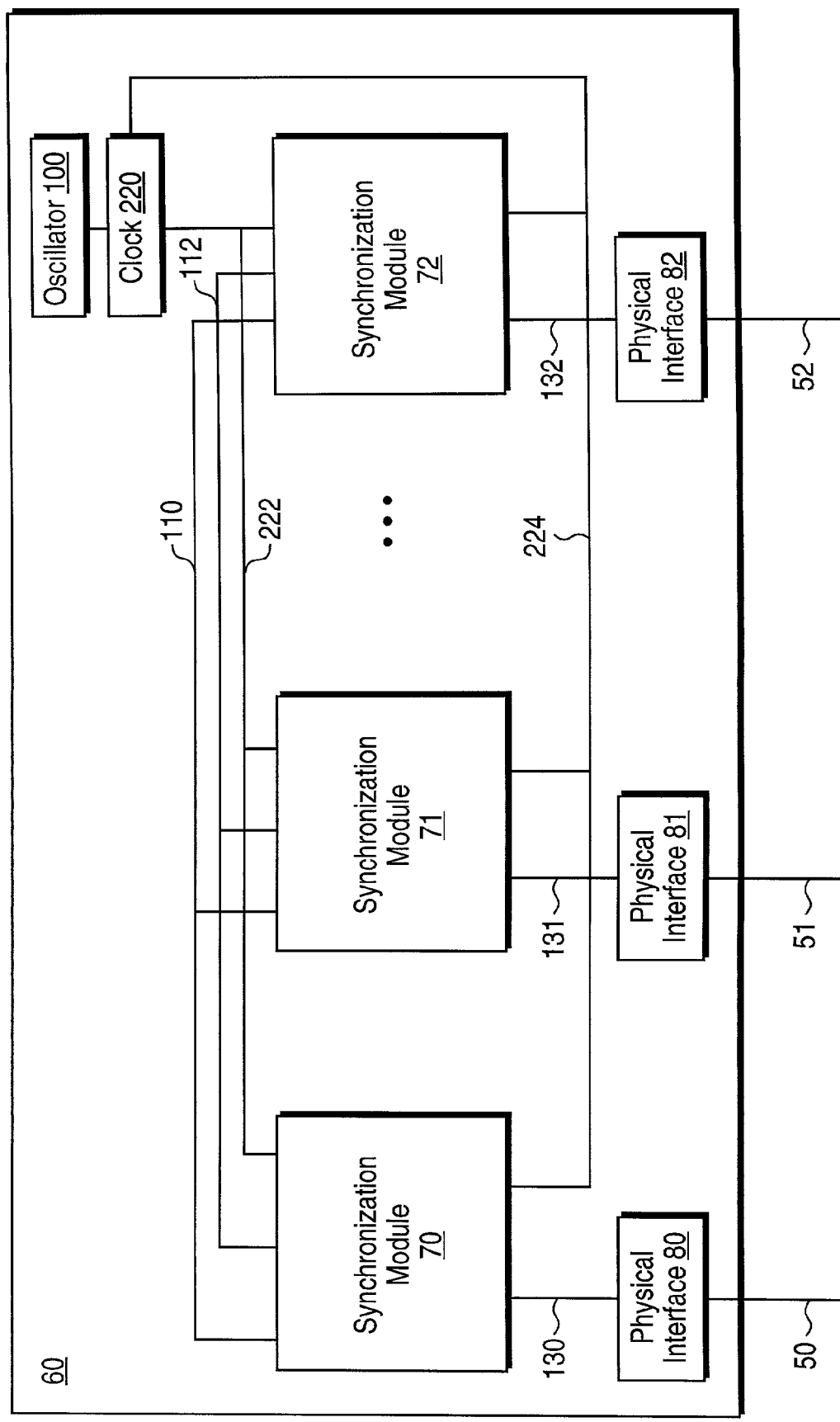
FIG. 5 illustrates a time synchronization bridge in another embodiment.

FIG. 5 illustrates the time synchronization bridge 60 in another embodiment. This embodiment includes a clock 220 which generates a time 222 for all of the synchronization modules 70–72. In this embodiment, there are no clocks in the individual synchronization modules 70–72 and the time 222 is used for the time-stamp functions of the clock synchronization protocol. In a manner similar to the selection of a primary clock, one of the synchronization modules 70–72 is selected to adjust the central clock 220. The selected synchronization module 70–72 places a set of slew information on a slew bus 224 to adjust the clock 220 and synchronize it to a master clock on one of the sub-nets 50–52.

In one embodiment, the time synchronization bridge 60 includes a GPS receiver or a calibrated atomic clock that allows it to be the master clock for the distributed system 200.

The time synchronization bridge 60 may be implemented in a modular design in which the communication bus 110, the master time pulse 116, and the control bus 112, etc. may be extended among multiple modular units depending on the number of sub-nets supported by the router 40. For example, a portion of the control bus 112 may be allocated for use internal to a modular unit and a portion of the control bus 112 allocated as a modular unit select function. A selector switch on each modular unit may be used to obtain a unique unit number. Each modular unit may synchronize to the clock of the synchronization module that is selected as the primary clock. Alternatively, each modular unit may share an external clock which may provide the 1-PPS signal. The communication of the time values may be accomplished using a multi-cast publishing operation of all of the modular units.

In one embodiment, the clock synchronization protocol and related mechanisms implemented in the nodes 10–12, 20–22, and 30–32 are those described in U.S. Pat. No. 5,566,180. Nodes having a local clock that functions as a master according to this synchronization protocol may be referred to as master clocks. Nodes having a local clock that functions as a slave according to this synchronization protocol may be referred to as slave clocks. Each slave clock may include circuitry for adjusting its respective local time based upon computations of the sending and receiving time of the timing data packets which are transferred via the sub-nets 50–52. A master clock on a sub-net periodically generates a timing data packet and transfers it via the sub-net. Each slave clock on the sub-net receives the timing data packet and in response latches a local time value. The master clock generates a follow up packet for each timing data packet and transfers it via the sub-net. Each follow up packet includes a time-stamp. Each slave clock receives the follow up packet and compares the latched local time value. Each slave clock uses the difference between the time-stamp and the latched local time value to adjust its local clock.

The nodes 10–12, 20–22, and 30–32 may be any type of node. For example, any one or more of the nodes 10–12, 20–22, and 30–32 may be a sensor node or an actuator node or an application controller node or a combination of these in a distributed control system. Any one or more of the nodes 10–12, 20–22, and 30–32 may be a computer system such as a personal computer with the processor being used to calculate clock adjustment parameters.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed system, comprising:
   a set of nodes that communicate via a set of sub-nets of the distributed system, the nodes each having a local clock, the nodes maintaining time synchronization among the local clocks by transferring a set of timing data packets via the sub-nets;
   time synchronization bridge that coordinates time synchronization among the sub-nets in response to the timing data packets by determining a highest quality clock among the local clocks and transferring an additional set of timing data packets via the sub-nets in response to the highest quality clock.

2. The distributed system of claim 1, wherein the time synchronization bridge maintains an internal time and synchronizes the internal time to a local clock on a selected one of the sub-nets.

3. The distributed system of claim 2, wherein the time synchronization bridge uses the internal time to synchronize the local clocks on the remaining ones of the sub-nets.

4. The distributed system of claim 1, wherein the time synchronization bridge maintains an internal time and synchronizes the local clocks to the internal time.

5. The distributed system of claim 1, wherein the time synchronization bridge determines the highest quality clock in response to a first set of clock meta-data in the timing data packets and a second set of clock meta-data associated with an internal time maintained by the time synchronization bridge.

6. The distributed system of claim 5, wherein the second set of clock meta-data indicates a GPS time source.

7. The distributed system of claim 5, wherein the second set of clock meta-data indicates an atomic clock time source.

8. The distributed system of claim 5, wherein the first set of clock meta-data includes an indication of quality of the corresponding local clock.

9. The distributed system of claim 5, wherein the first set of clock meta-data includes an indication a number of other time synchronization bridges traversed by the corresponding timing data packet.

10. The distributed system of claim 5, wherein the first set of clock meta-data includes an indication that the corresponding local clock is preferred as the highest quality clock.

11. A time synchronization bridge, comprising:
   means for maintaining an internal time in the time synchronization bridge;
   a set of synchronization modules corresponding to a set of sub-nets, each synchronization module having means for adjusting the internal time in response to a set of timing data packets received via the corresponding sub-net and means for distributing the internal time via the corresponding sub-net;
   means for determining a highest quality clock for the sub-nets in response to the timing data packets and means for transferring an additional set of timing data packets via the sub-nets in response to the highest quality clock.

12. The time synchronization bridge of claim 11, wherein each synchronization module includes a clock and means for synchronizing the clock in response to the timing data packets received via the corresponding sub-net.

13. The time synchronization bridge of claim 12, wherein the means for maintaining an internal time includes means for selecting one of the clocks as a primary clock in the time synchronization bridge such that the clocks synchronize to the primary clock.

14. The time synchronization bridge of claim 13, wherein the means for selecting includes means for selecting the primary clock in response to a set of clock meta-data contained in the timing data packets.

15. The time synchronization bridge of claim 11, wherein the means for maintaining an internal time comprises a central clock.

16. A time synchronization bridge, comprising:
   means for maintaining an internal time in the time synchronization bridge;
   a set of synchronization modules corresponding to a set of sub-nets, each synchronization module having means for adjusting the internal time in response to a set of timing data packets received via the corresponding sub-net and means for distributing the internal time via the corresponding sub-net wherein the means for maintaining an internal time comprises a central clock and wherein each synchronization module includes means for adjusting the central clock in response to the timing data packets received via the corresponding sub-net and means for selecting one of the synchronization modules to adjust the clock.

17. The time synchronization bridge of claim 16, wherein the means for selecting includes means for selecting one of the synchronization modules in response to a set of clock meta-data contained in the timing data packets.

18. The time synchronization bridge of claim 16, further comprising a GPS time source.

19. The time synchronization bridge of claim 16, further comprising an atomic clock time source.

* * * * *